US012643546B2

(12) United States Patent
Chen et al.

(10) Patent No.: US 12,643,546 B2
(45) Date of Patent: Jun. 2, 2026

(54) ANTHROPOMORPHIC LANE-CHANGING CONTROL METHOD AND SYSTEM BASED ON DRIVING RISK QUANTIFICATION, AND VEHICLE

(71) Applicant: Jilin University, Changchun City (CN)

(72) Inventors: Hong Chen, Changchun City (CN);
Huihua Gao, Changchun City (CN);
Ting Qu, Changchun City (CN);
Junwu Zhao, Changchun City (CN);
Yunfeng Hu, Changchun City (CN);
Xun Gong, Changchun City (CN);
Qijun Chen, Changchun City (CN)

(73) Assignees: Jilin University, Changchun City (CN);
Chongqing Research Institute, Jilin University, Chongqing City (CN)

( * ) Notice: Subject to any disclaimer, the term of this patent is extended or adjusted under 35 U.S.C. 154(b) by 18 days.

(21) Appl. No.: 18/623,776

(22) Filed: Apr. 1, 2024

(65) Prior Publication Data

US 2025/0304071 A1 Oct. 2, 2025

(51) Int. Cl.
B60W 30/18 (2012.01)
B60W 30/09 (2012.01)
(Continued)

(52) U.S. Cl.
CPC ...... B60W 30/18163 (2013.01); B60W 30/09 (2013.01); B60W 30/0956 (2013.01);
(Continued)

(58) Field of Classification Search
CPC .............. B60W 30/09; B60W 30/095; B60W 30/0953; B60W 30/0956;
(Continued)

(56) References Cited

U.S. PATENT DOCUMENTS

2016/0090087 A1* 3/2016 Lee ................. B60W 30/18163
701/93
2017/0247032 A1* 8/2017 Lee ....................... B60W 30/12
(Continued)

FOREIGN PATENT DOCUMENTS

CN 110614998 A * 12/2019 ............ B60W 10/20
CN 113276848 A * 8/2021 ............ B60W 40/02
(Continued)

*Primary Examiner* — John M Zaleskas
(74) *Attorney, Agent, or Firm* — FERENCE & ASSOCIATES LLC

(57) ABSTRACT

The present disclosure discloses an anthropomorphic lane-changing control method and system based on driving risk quantification, and a vehicle. The method includes: determining whether a main vehicle has a lane-changing intention based on motion statuses of the main vehicle and a front vehicle in a current lane; if there is a lane-changing intention, generating an anthropomorphic lane-changing trajectory that satisfies safety constraints and reachability constraints; based on a motion status of a traffic participant that causes a risk to the main vehicle, calculating an overall risk level and determining whether the anthropomorphic lane-changing trajectory satisfies risk constraints; and if the risk constraints are not satisfied, regenerating an anthropomorphic lane-changing trajectory; or if the risk constraints are satisfied, performing tracking control based on a preview-following theory. In the present disclosure, a lane-changing intention is described and identified based on actually measured data, to generate an anthropomorphic lane-changing trajectory.

7 Claims, 12 Drawing Sheets

(51) Int. Cl.
    *B60W 30/095*     (2012.01)
    *B60W 60/00*     (2020.01)
    *G06N 3/084*     (2023.01)

(52) U.S. Cl.
    CPC ......... *B60W 60/0011* (2020.02); *G06N 3/084* (2013.01); *B60W 2420/403* (2013.01); *B60W 2420/408* (2024.01); *B60W 2520/105* (2013.01); *B60W 2520/125* (2013.01); *B60W 2540/18* (2013.01); *B60W 2552/53* (2020.02); *B60W 2554/4041* (2020.02); *B60W 2554/4042* (2020.02)

(58) Field of Classification Search
    CPC ..... B60W 30/18163; B60W 2420/403; B60W 2420/408; B60W 2520/105; B60W 2520/125; B60W 2540/18; B60W 2554/4041; B60W 2554/4042; G06N 3/084
    See application file for complete search history.

(56) References Cited

U.S. PATENT DOCUMENTS

| | | | | |
|---|---|---|---|---|
| 2018/0297638 | A1 * | 10/2018 | Fujii | B60W 30/12 |
| 2019/0023268 | A1 * | 1/2019 | Pink | B60W 30/10 |
| 2019/0096258 | A1 * | 3/2019 | Ide | B62D 15/025 |
| 2019/0196487 | A1 * | 6/2019 | Akiyama | B60W 30/18163 |
| 2019/0315365 | A1 * | 10/2019 | Kim | B60W 50/14 |
| 2019/0391582 | A1 * | 12/2019 | Jung | B60Q 1/525 |
| 2020/0114910 | A1 * | 4/2020 | Han | G08G 1/167 |
| 2021/0253095 | A1 * | 8/2021 | Jiang | B60W 30/18163 |
| 2021/0284145 | A1 * | 9/2021 | Lee | B60W 30/09 |
| 2021/0291818 | A1 * | 9/2021 | Barth | B60W 30/0956 |
| 2021/0309217 | A1 * | 10/2021 | Kim | G08G 1/165 |
| 2022/0048513 | A1 * | 2/2022 | Xu | B60W 30/18163 |
| 2022/0048535 | A1 * | 2/2022 | Niendorf | G01C 21/165 |
| 2023/0037367 | A1 * | 2/2023 | Qian | B60W 30/18163 |
| 2023/0096493 | A1 * | 3/2023 | Alamdari Sajadi | B62D 15/025 |
| | | | | 701/41 |
| 2023/0294684 | A1 * | 9/2023 | Yang | B60W 50/0097 |
| | | | | 701/26 |
| 2023/0322267 | A1 * | 10/2023 | Mei | B60W 30/165 |
| | | | | 701/26 |
| 2024/0351615 | A1 * | 10/2024 | Song | B60W 30/18163 |
| 2025/0187600 | A1 * | 6/2025 | Jo | B60W 30/09 |

FOREIGN PATENT DOCUMENTS

| | | | | | |
|---|---|---|---|---|---|
| CN | | 114537380 | A * | 5/2022 | ...... B60W 30/18163 |
| WO | WO-2023231569 | A1 * | 12/2023 | ...... B60W 60/00274 |

* cited by examiner

1

ANTHROPOMORPHIC LANE-CHANGING CONTROL METHOD AND SYSTEM BASED ON DRIVING RISK QUANTIFICATION, AND VEHICLE

TECHNICAL FIELD

The present disclosure relates to the technical field of autonomous driving tests, and in particular, to an anthropomorphic lane-changing control method and system based on driving risk quantification, and a vehicle.

BACKGROUND

A lane-changing behavior is one of the most complex and frequent behaviors performed in daily driving. Specifically, a lane-changing process can be further divided into a series of procedures such as lane-changing intention decision-making, lane-changing trajectory planning, driving risk quantification, and vehicle motion control. The lane-changing behavior needs to comprehensively consider subjective driving willingness and a dynamic impact of a surrounding vehicle.

SUMMARY

The present disclosure provides an anthropomorphic lane-changing control method and system based on driving risk quantification, to comprehensively consider the subjective driving intentions and dynamic influence of surrounding vehicles in lane-changing control, while ensuring the safety of lane-changing control and improving user experience.

To achieve the above objective, the present disclosure provides the following technical solutions.

The present disclosure provides an anthropomorphic lane-changing control method based on driving risk quantification. The method includes the following steps:

determining whether a main vehicle has a lane-changing intention based on motion statuses of the main vehicle and a front vehicle in a current lane; where the motion statuses of the main vehicle include a position, a speed, and an acceleration of the main vehicle, and the motion statuses of the front vehicle include a position, a speed, and an acceleration of the front vehicle;

if there is a lane-changing intention, generating an anthropomorphic lane-changing trajectory that satisfies safety constraints and reachability constraints;

determining, based on a motion status of a traffic participant that causes a risk to the main vehicle, whether the anthropomorphic lane-changing trajectory satisfies risk constraints; and if the risk constraints are not satisfied, regenerating an anthropomorphic lane-changing trajectory that satisfies the safety constraints and the reachability constraints, and returning to the step of "determining, based on a motion status of a traffic participant that causes a risk to the main vehicle, whether the anthropomorphic lane-changing trajectory satisfies risk constraints"; or if the risk constraints are satisfied, performing tracking control on the anthropomorphic lane-changing trajectory based on a preview-following theory.

Optionally, the lane-changing intention includes an obstacle-avoidance lane-changing intention and/or a non-obstacle-avoidance lane-changing intention.

The determining whether a main vehicle has a lane-changing intention based on motion statuses of the main vehicle and a front vehicle in a current lane specifically includes:

inputting operating statuses of the main vehicle and the front vehicle in the current lane into a trained back propagation (BP) neural network to determine whether the obstacle-avoidance lane-changing intention is generated; and based on whether a non-obstacle-avoidance lane-changing intention parameter of the main vehicle exceeds a non-obstacle-avoidance lane-changing intention parameter threshold, determining whether the non-obstacle-avoidance lane-changing intention is generated.

Optionally, the non-obstacle-avoidance lane-changing intention parameter is calculated based on the following formula:

$$D(k) = \begin{cases} D(k-1) + \dfrac{v_0 - v(k)}{v(k)} \cdot T, \ v(k) \le v_0 \\ 0, \ v(k) > v_0 \end{cases}.$$

D(k) and D(k−1) represent non-obstacle-avoidance lane-changing intention parameters calculated based on a $k^{th}$ sampling and a $(k-1)^{th}$ sampling respectively, $v_0$ represents an expected cruising speed, and v(k) represents a vehicle speed at which the main vehicle follows the front vehicle and that is obtained in the $k^{th}$ sampling, and T represents a sampling interval.

Optionally, the generating an anthropomorphic lane-changing trajectory that satisfies safety constraints and reachability constraints specifically includes:

constructing a quintic polynomial that represents the anthropomorphic lane-changing trajectory;

using, as a lane-changing start point status, a motion status of the main vehicle at a moment when the lane-changing intention is generated;

randomly generating a plurality of types of lane-changing feature parameters based on lane-changing feature parameter distribution;

determining, based on each of the plurality of types of lane-changing feature parameters, a lane-changing end point status corresponding to each type of lane-changing feature parameter;

based on the lane-changing start point status and the lane-changing end point status corresponding to each type of lane-changing feature parameter, solving a parameter in the quintic polynomial and obtaining anthropomorphic lane-changing trajectories corresponding to the plurality of types of lane-changing feature parameters; and selecting, from the anthropomorphic lane-changing trajectories corresponding to the plurality of types of lane-changing feature parameters, the anthropomorphic lane-changing trajectory that satisfies the safety constraints and the reachability constraints;

Optionally, the safety constraints include:

$$|y_{max} - y_0| \le \frac{3}{2} W_{Lane} - \frac{1}{2} W_{Vehicle},$$

and $$|y_1 - y_{Centerline}| \le \frac{1}{2} W_{Vehicle}.$$

$y_{max}$ represents maximum lateral displacement during lane changing, $y_0$ represents a lateral position at a lane-changing start point, $W_{Lane}$ represents a lane width, $W_{vehicle}$ represents a vehicle width, $y_1$ represents a lateral position at a lane-changing end point, and $y_{Centerline}$ represents a lateral position of a lane centerline after lane changing.

Optionally, the reachability constraints include:

during lane changing, a longitudinal acceleration of the main vehicle is within a reachable longitudinal acceleration range, a lateral acceleration of the main vehicle is within a reachable lateral acceleration range, and a curvature of the main vehicle is within a reachable curvature range.

Optionally, the risk constraints include:

$$R = \sum_{i=1}^{n} V_i P_{dynamic,i} \le R_{threshold},$$

$$P_{dynamic,i} = \sum_{j=0}^{5} P\left(x_i + \frac{jT_{risk}v_i}{5}, y_i\right),$$

and $$P\left(x_i + \frac{jT_{risk}v_i}{5}, y_i\right) =$$

$$\frac{s - s\left(x_i + \frac{jT_{risk}v_i}{5}\right)}{s} \cdot \frac{1}{\sqrt{2\pi}\sigma} \exp\left(-\frac{\left(y_i - f\left(x_i + \frac{jT_{risk}v_i}{5}\right)\right)^2}{2\sigma^2}\right).$$

R represents an overall risk level in a current dynamic lane-changing risk field, $V_i$ represents a risk value of an $i^{th}$ traffic participant, $R_{threshold}$ represents a risk level threshold, $P_{dynamic,i}$ represents intensity of a risk caused by the $i^{th}$ traffic participant, $T_{risk}$ represents a risk evaluation period, $v_i$ represents a driving speed of the $i^{th}$ traffic participant, $x_i$ and $y_i$ respectively represent an x-axis coordinate and a y-axis coordinate of the $i^{th}$ traffic participant in a current position, j represents a $j^{th}$ moment, s represents a length of the overall lane-changing trajectory, $$s\left(x_i + \frac{jT_{risk}v_i}{5}\right)$$

represents a length of the anthropomorphic lane-changing trajectory at a point $$x_i + \frac{jT_{risk}v_i}{5},$$

and $\sigma$ represents a width coefficient of the lane-changing risk field.

Optionally, the performing tracking control on the anthropomorphic lane-changing trajectory based on a preview-following theory specifically includes:

determining, based on the anthropomorphic lane-changing trajectory, an ideal longitudinal acceleration and an ideal lateral acceleration of the main vehicle after preview time $T_p$ elapses;

calculating a steering wheel angle based on the ideal lateral acceleration, as shown in the following expression:

$$\delta_{SW} = \frac{a_y^*}{G_{ay}},$$

where $\delta_{SW}$ represents the steering wheel angle, $G_{ay}$ represents a gain of a vehicle lateral acceleration relative to the steering wheel angle, and $a_y^*$ represents the ideal lateral acceleration; and calculating a pedal opening degree based on the ideal longitudinal acceleration, as shown in the following expression:

$$\alpha = \left(K_p + K_d s + \frac{K_i}{s}\right)(a_x^* - a_x),$$

where $\alpha$ represents the pedal opening degree, $K_p$ represents a proportional coefficient, $K_i$ represents an integral coefficient, $K_d$ represents a differential coefficient, s represents a Laplace operator, $a_x^*$ represents the ideal longitudinal acceleration, and $a_x$ represents a current longitudinal acceleration of the main vehicle.

An electronic device is provided, including a memory, a processor, and a computer program that is stored in the memory and can be executed by the processor. When the processor executes the computer program, the following steps are implemented:

determining whether a main vehicle has a lane-changing intention based on motion statuses of the main vehicle and a front vehicle in a current lane; wherein the motion statuses of the main vehicle comprise a position, a speed, and an acceleration of the main vehicle, and the motion statuses of the front vehicle comprise a position, a speed, and an acceleration of the front vehicle;

if there is a lane-changing intention, generating an anthropomorphic lane-changing trajectory that satisfies safety constraints and reachability constraints;

determining, based on a motion status of a traffic participant that causes a risk to the main vehicle, whether the anthropomorphic lane-changing trajectory satisfies risk constraints; and if the risk constraints are not satisfied, regenerating an anthropomorphic lane-changing trajectory that satisfies the safety constraints and the reachability constraints, and returning to the step of "determining, based on a motion status of a traffic participant that causes a risk to the main vehicle, whether the anthropomorphic lane-changing trajectory satisfies risk constraints"; or if the risk constraints are satisfied, performing tracking control on the anthropomorphic lane-changing trajectory based on a preview-following theory.

An autonomous vehicle is provided, where a vehicle controller of the autonomous vehicle is integrated with a computer program; or the autonomous vehicle includes a lane-changing controller, the lane-changing controller is connected to the vehicle controller via a Controller Area Network (CAN) bus or a Local Interconnect Network (LIN) bus, and the lane-changing controller is integrated with the computer program;

the vehicle controller is connected to a first sensor component and a second sensor component of the autonomous vehicle via the CAN bus or the LIN bus, the first sensor component is configured to obtain a motion status of the autonomous vehicle, and the second sensor component is configured to obtain a motion status of a front vehicle of the autonomous vehicle;

the first sensor component comprises a position sensor, a speed sensor, and an acceleration sensor;

the second sensor component comprises a lidar and a camera;

the vehicle controller is also connected to a control end of a steering wheel and a control end of a pedal of the autonomous vehicle via the CAN bus or the LIN bus; and when the vehicle controller or the lane-changing controller executes the computer program, the following steps are implemented:

determining whether a main vehicle has a lane-changing intention based on motion statuses of the main vehicle and a front vehicle in a current lane; wherein the motion statuses of the main vehicle comprise a position, a speed, and an acceleration of the main vehicle, and the motion statuses of the front vehicle comprise a position, a speed, and an acceleration of the front vehicle;

if there is a lane-changing intention, generating an anthropomorphic lane-changing trajectory that satisfies safety constraints and reachability constraints;

determining, based on a motion status of a traffic participant that causes a risk to the main vehicle, whether the anthropomorphic lane-changing trajectory satisfies risk constraints; and if the risk constraints are not satisfied, regenerating an anthropomorphic lane-changing trajectory that satisfies the safety constraints and the reachability constraints, and returning to the step of "determining, based on a motion status of a traffic participant that causes a risk to the main vehicle, whether the anthropomorphic lane-changing trajectory satisfies risk constraints"; or if the risk constraints are satisfied, performing tracking control on the anthropomorphic lane-changing trajectory based on a preview-following theory.

According to specific embodiments provided in the present disclosure, the present disclosure has the following technical effects:

Embodiments of the present disclosure disclose an anthropomorphic lane-changing control method and system based on driving risk quantification, and a vehicle. The method includes the following steps: determining whether a main vehicle has a lane-changing intention based on motion statuses of the main vehicle and a front vehicle in a current lane; if there is a lane-changing intention, generating an anthropomorphic lane-changing trajectory that satisfies safety constraints and reachability constraints; based on a motion status of a traffic participant that causes a risk to the main vehicle, calculating an overall risk level for all traffic participants and determining, based on the overall risk level, whether the anthropomorphic lane-changing trajectory satisfies risk constraints; if the risk constraints are not satisfied, regenerating an anthropomorphic lane-changing trajectory that satisfies the safety constraints and the reachability constraints, and returning to the step of "determining, based on a motion status of a traffic participant that causes a risk to the main vehicle, whether the anthropomorphic lane-changing trajectory satisfies risk constraints"; or if the risk constraints are satisfied, performing tracking control on the anthropomorphic lane-changing trajectory based on a preview-following theory. In the present disclosure, a lane-changing intention is described and identified based on actually measured data, to generate an anthropomorphic lane-changing trajectory. In addition, a risk in a lane-changing process is quantified to implement automatic control for an anthropomorphic lane-changing process. This improves anthropomorphic performance of a vehicle in lane changing, while ensuring the safety of lane-changing control and improving user experience.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

Figure 1:
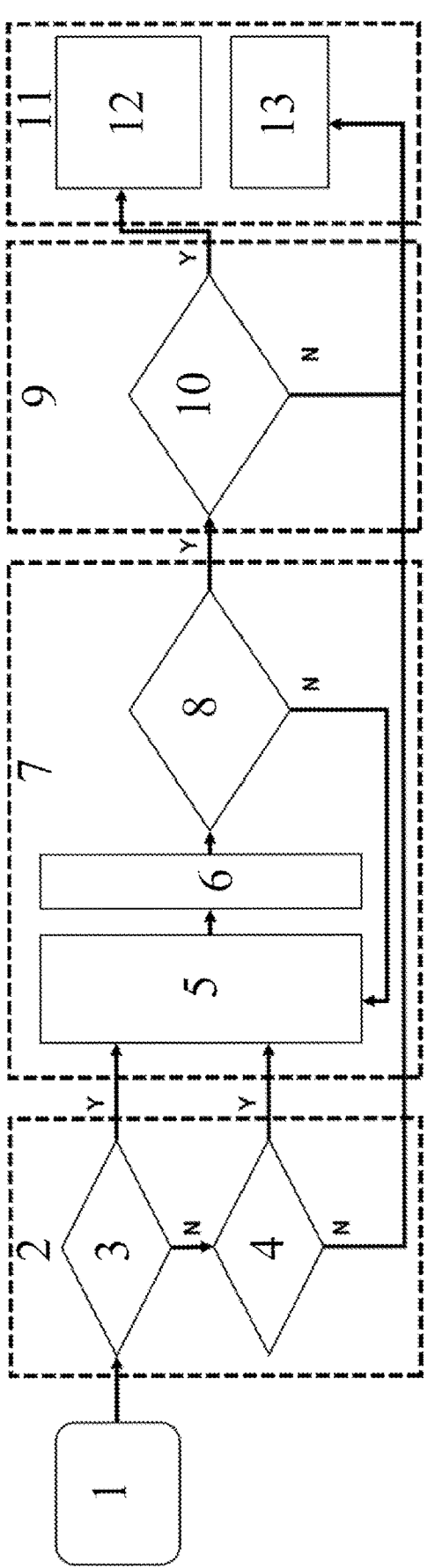
FIG. 1 is an overall block diagram of a lane-changing model of an anthropomorphic lane-changing control method based on driving risk quantification according to an embodiment of the present disclosure.

Reference numerals in FIG. 1:

1—Road environment information

2—Lane-changing intention

3—Is obstacle-avoidance lane changing to be performed?

4—Is non-obstacle-avoidance lane changing to be performed?

5—Randomly generate a lane-changing end point status based on a distribution fitting result of actually measured data 6—Perform fitting by using a quintic polynomial 7—Trajectory planning 8—Are safety constraints and reachability constraints satisfied?

9—Risk evaluation

10—Does a dynamic lane-changing risk satisfy a requirement?

11—Trajectory tracking

12—Track a trajectory (along an expected lane-changing trajectory)

13—Stay in lane (along a lane centerline)

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely some but not all of the embodiments of the present disclosure. All other embodiments obtained by those skilled in the art based on the embodiments of the present disclosure without creative efforts shall fall within the protection scope of the present disclosure.

The present disclosure provides an anthropomorphic lane-changing control method and system based on driving risk quantification, and a vehicle, to improve anthropomorphic performance of a background vehicle in lane changing in a simulation testing environment and further to improve capabilities of and efficiency in virtual simulation tests.

In order to make the above objective, features and advantages of the present disclosure clearer and more comprehensible, the present disclosure will be further described in detail below in combination with accompanying drawings and particular implementation modes.

A key to improving anthropomorphic performance of a lane-changing model is to perform analysis and modeling on attributes of human factors inherent in a lane-changing process based on actually measured data. The present disclosure specifically focuses on the following three aspects:

A cause of a lane-changing intention is analyzed and identified. When a main vehicle cannot drive at a desired speed for a long time because a front vehicle keeps driving at a low speed for a long time, it is expected to drive at a higher speed by actively performing lane changing. This type of active lane-changing behavior is referred to as non-obstacle-avoidance lane changing. When the front vehicle implements emergency braking, the main vehicle performs lane changing to avoid a collision for a risk avoidance purpose. This type of passive lane-changing behavior is referred to as obstacle-avoidance lane changing.

A method for generating a personalized lane-changing trajectory that satisfies safety and reachability constraints is created. Kinematic and dynamic features of a vehicle, individual needs of a driver, and impacts of other background vehicles on lane-changing safety are comprehensively considered. A lane-changing trajectory is constructed based on a quintic polynomial, which ensures continuity of a vehicle driving trajectory and continuity of vehicle speed and acceleration variances. A trajectory parameter can be obtained by solving a linear equation, which ensures rapid generation of a trajectory.

A lane-changing risk field that fully considers a dynamic impact of a surrounding vehicle is established for evaluating safety of a lane-changing behavior. The lane-changing risk field is established to quantify a static risk in a current scenario at a specific moment and a possible risk of a lane-changing behavior in a future time period, and a risk quantification result is used as a criterion for determining whether a lane-changing behavior satisfies risk constraints.

The present disclosure describes and identifies a lane-changing intention based on actually measured data, explores a method for generating an anthropomorphic lane-changing trajectory, and quantifies a risk in a lane-changing process, to generate a trajectory for an anthropomorphic lane-changing process.

FIG. 1 is an overall block diagram of the technical solution provided in embodiments of the present disclosure. A lane-changing intention module is configured to determine whether lane changing needs to be performed based on real-time motion statuses of a main vehicle and a front vehicle in a current lane. A trajectory planning module is configured to plan a smooth, safe, and reachable lane-changing trajectory after a lane-changing intention is generated. A risk evaluation module is configured to evaluate whether a lane-changing operation to be performed satisfies safety requirements. A trajectory tracking module is configured to trace an expected lane-changing trajectory.

Embodiment 1

An embodiment of the present disclosure provides an anthropomorphic lane-changing control method based on driving risk quantification. The method includes the following steps:

Step 101: Determine whether a main vehicle has a lane-changing intention based on motion statuses of the main vehicle and a front vehicle in a current lane. The motion statuses of the main vehicle include a position, a speed, and an acceleration of the main vehicle, and the motion statuses of the front vehicle include a position, a speed, and an acceleration of the front vehicle.

In Step 101 in the present disclosure, a lane-changing intention identification model is established. Specifically, it is first determined, based on real-time motion statuses of the main vehicle and the front vehicle in the current lane, whether obstacle-avoidance lane changing needs to be performed. If it is determined that obstacle-avoidance lane changing needs to be performed, an obstacle-avoidance lane-changing intention is generated. If it is determined that obstacle-avoidance lane changing does not need to be performed, it is further determined whether non-obstacle-avoidance lane changing needs to be performed. If it is determined that non-obstacle-avoidance lane changing needs to be performed, a non-obstacle-avoidance lane-changing intention is generated. If it is determined that non-obstacle-avoidance lane changing does not need to be performed, vehicle-following continues.

In an actual traffic scenario, a lane-changing behavior is not only dependent on willingness of the driver, but also is closely related to a road environment and a behavior of another traffic participant. When the front vehicle implements emergency braking, the main vehicle performs lane changing to avoid a collision for a risk avoidance purpose. In other words, obstacle-avoidance lane changing is performed. When the main vehicle cannot drive at a desired speed for a long time because the front vehicle keeps driving at a low speed for a long time, it is expected to drive at a higher speed by actively performing lane changing. In other words, non-obstacle-avoidance lane changing is performed.

It is first determined, based on real-time motion statuses of the main vehicle and the front vehicle in the current lane, whether obstacle-avoidance lane changing needs to be performed. If it is determined that obstacle-avoidance lane changing needs to be performed, an obstacle-avoidance lane-changing motivation is generated. If it is determined that obstacle-avoidance lane changing does not need to be performed, it is further determined whether non-obstacle-avoidance lane changing needs to be performed. If it is determined that non-obstacle-avoidance lane changing needs to be performed, a non-obstacle-avoidance lane-changing motivation is generated. If it is determined that non-obstacle-avoidance lane changing does not need to be performed, vehicle-following continues.

Figure 2:
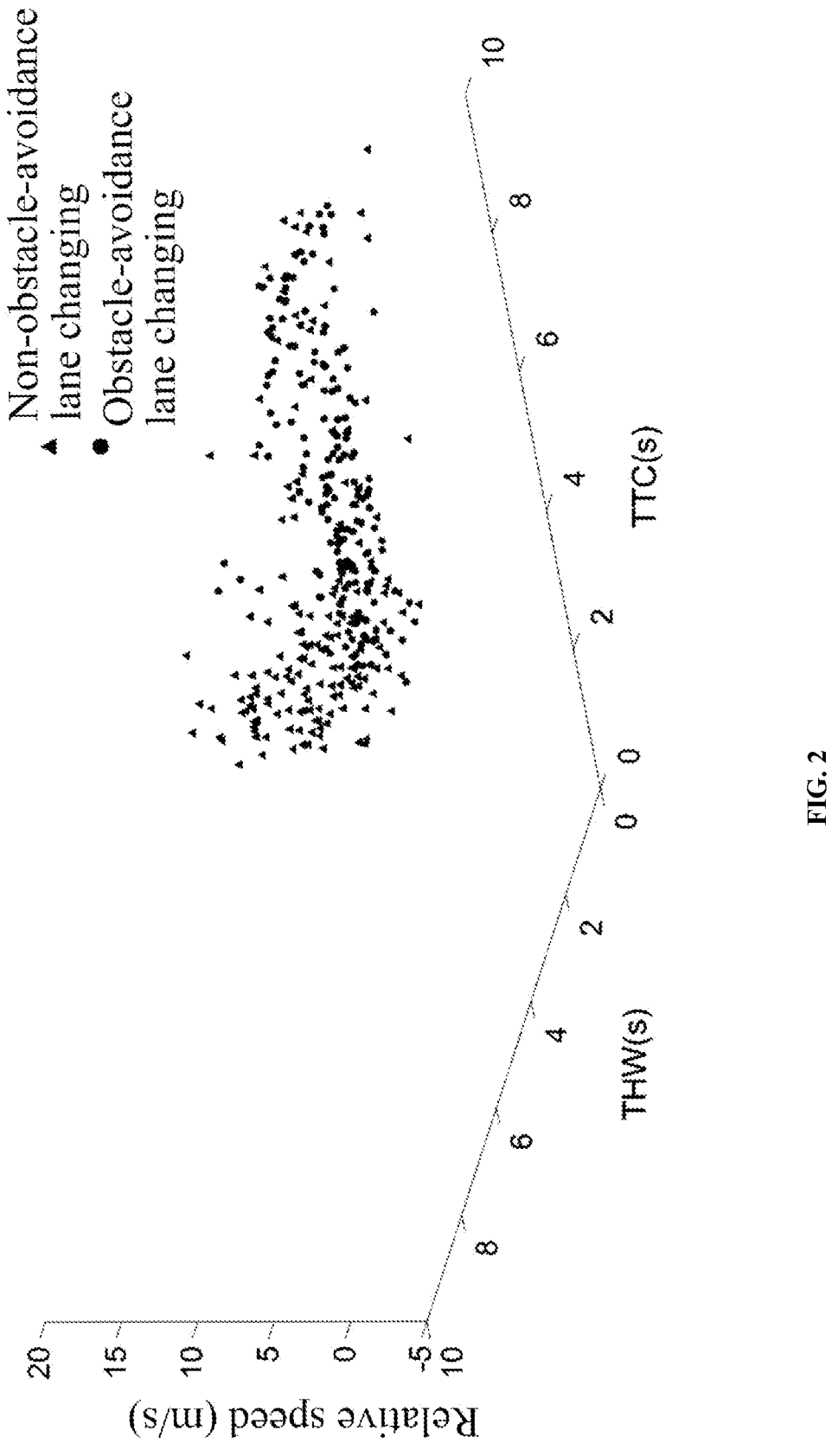
FIG. 2 is a scatter chart of feature parameter distribution at a lane-changing start point in two scenarios according to an embodiment of the present disclosure.

Analysis of actually measured lane-changing behavioral data shows that: time to collision (TTC) and time headway (THW) at a start point of obstacle-avoidance lane changing are shorter than those at a start point of non-obstacle-avoidance lane changing. In addition, a relative speed at the start point of obstacle-avoidance lane changing is higher due to emergency braking of the front vehicle. To further observer differences in the two scenarios, a scatter chart shown in FIG. 2 is drawn.

A modeling process of the obstacle-avoidance lane-changing intention is considered as a binary classification problem. In the present disclosure, obstacle-avoidance lane-changing and non-obstacle-avoidance lane-changing behaviors are classified based on a BP neural network, and debugging is performed for a plurality of times. Table 1 shows final configurations of hyperparameters of the BP neural network. An output result of the BP neural network is used to determine whether the obstacle-avoidance lane-changing intention is generated.

TABLE 1

Hyperparameter configurations of the BP neural network

| Parameter name | Value |
|---|---|
| Quantity of neural network layers | 2 |
| Quantity of neurons | 20 neurons at a first layer and 10 neurons at a second layer |
| Activation function | Rectified linear unit (ReLU) function |
| Quantity of iterations | 1,000 |

A main cause of non-obstacle-avoidance lane changing is that the front vehicle drives at a low speed for a long time. To quantify a tolerance to long-term low-speed driving of the front vehicle, a variable, namely, a non-obstacle-avoidance lane-changing intention parameter, is defined in the present disclosure to describe a generation process of the non-obstacle-avoidance lane-changing intention. An expression of the non-obstacle-avoidance lane-changing intention parameter is as follows:

$$D(k) = \begin{cases} D(k-1) + \dfrac{v_0 - v(k)}{v(k)} \cdot T, & v(k) \le v_0 \\ 0, & v(k) > v_0 \end{cases} \quad (1)$$

D represents the non-obstacle-avoidance lane-changing intention parameter, which is measured in s; $v_0$ represents an expected cruising speed, which is measured in m/s; v represents a vehicle speed, which is measured in m/s; and T represents a sampling interval, which is measured in S.

After the non-obstacle-avoidance lane-changing intention parameter is used, a non-obstacle-avoidance lane-changing behavior may be described as follows: As the front vehicle keeps driving at low speed for a long time, the current vehicle is caused to drive at a speed lower than the expected cruising speed for a long time. Consequently, the value of the non-obstacle-avoidance lane-changing intention parameter accumulates. When the non-obstacle-avoidance lane-changing intention parameter exceeds a non-obstacle-avoidance lane-changing intention parameter threshold$_{threshold}$, the non-obstacle-avoidance lane-changing intention is generated. The expected cruising speed in the expression of the non-obstacle-avoidance lane-changing intention parameter cannot be directly obtained through a dialog with the driver. In the present disclosure, a one-dimensional cluster center of a sequence of vehicle speeds generated after lane changing is performed is used as the expected cruising speed.

Figure 3:
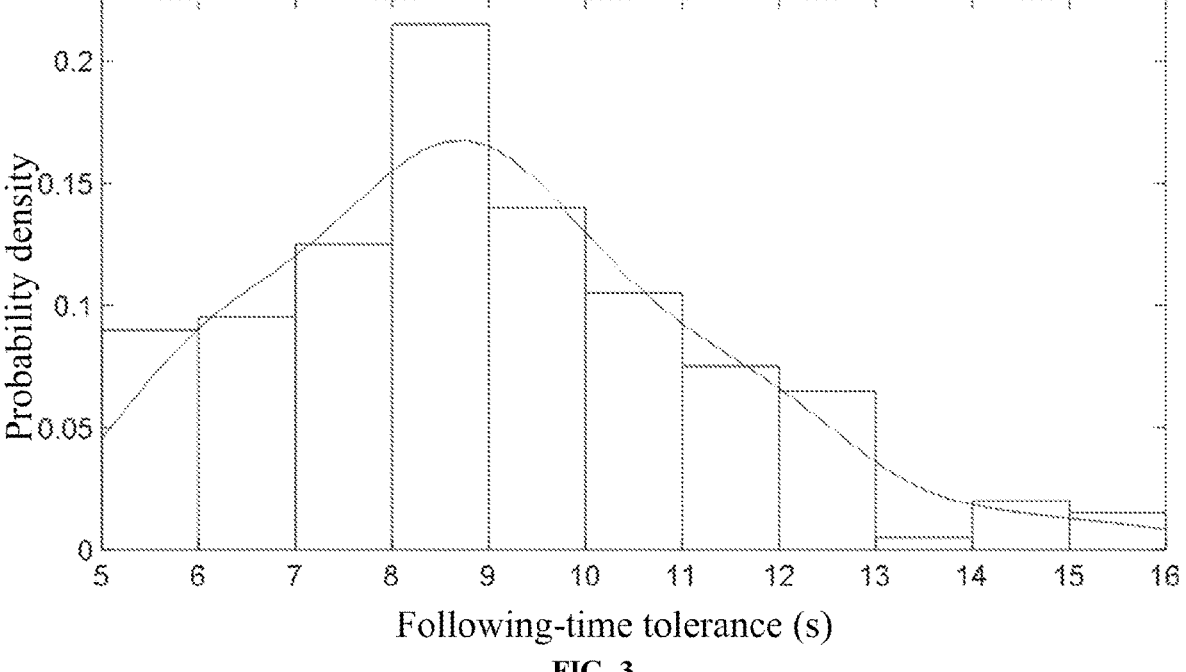
FIG. 3 shows a distribution curve of a non-obstacle-avoidance lane-changing intention parameter according to an embodiment of the present disclosure.
Figure 4A:
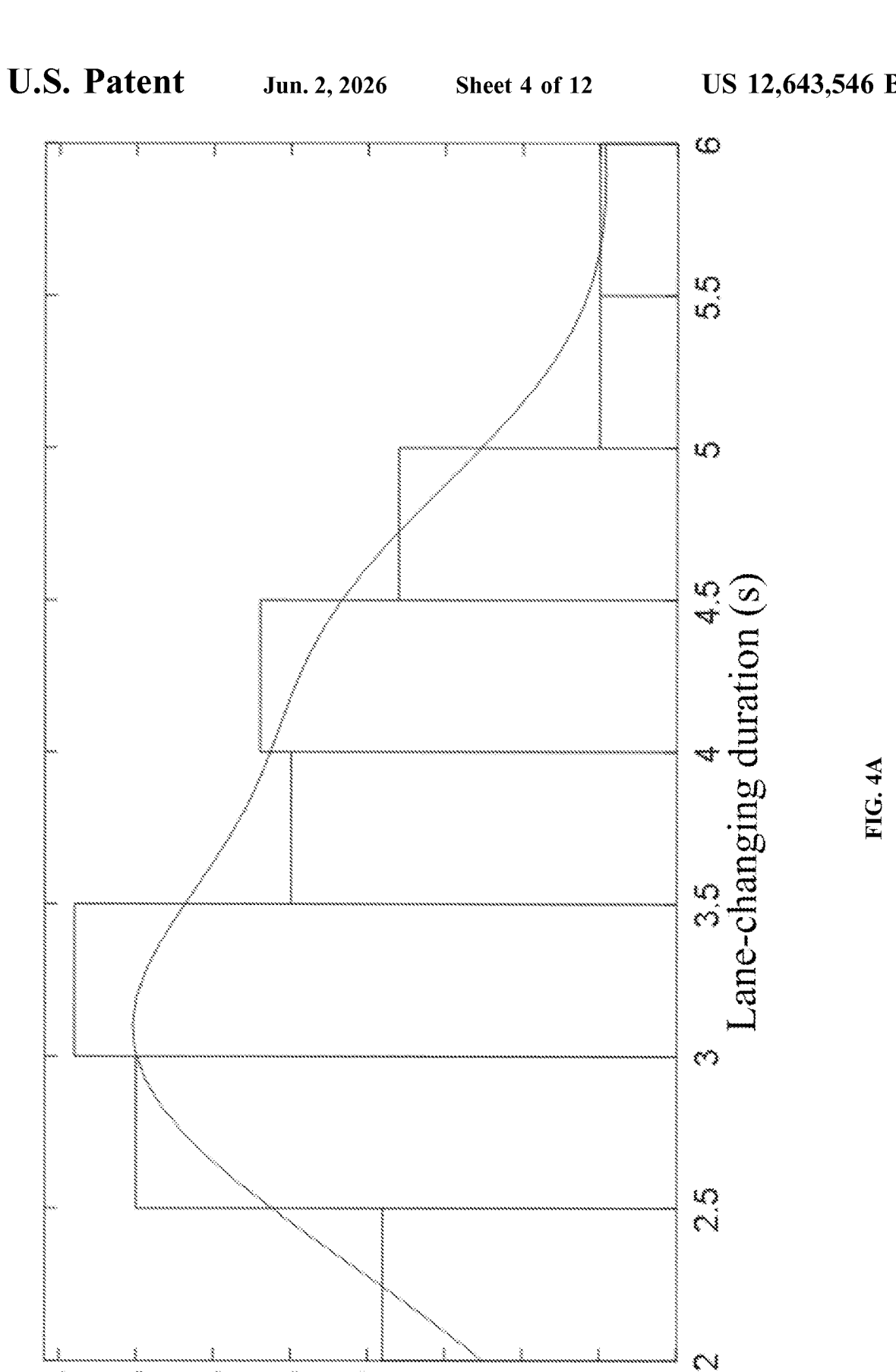
FIGS. 4A-4C show feature parameter distribution of a lane-changing trajectory in an obstacle-avoidance lane-changing condition according to an embodiment of the present disclosure.
Figure 4B:
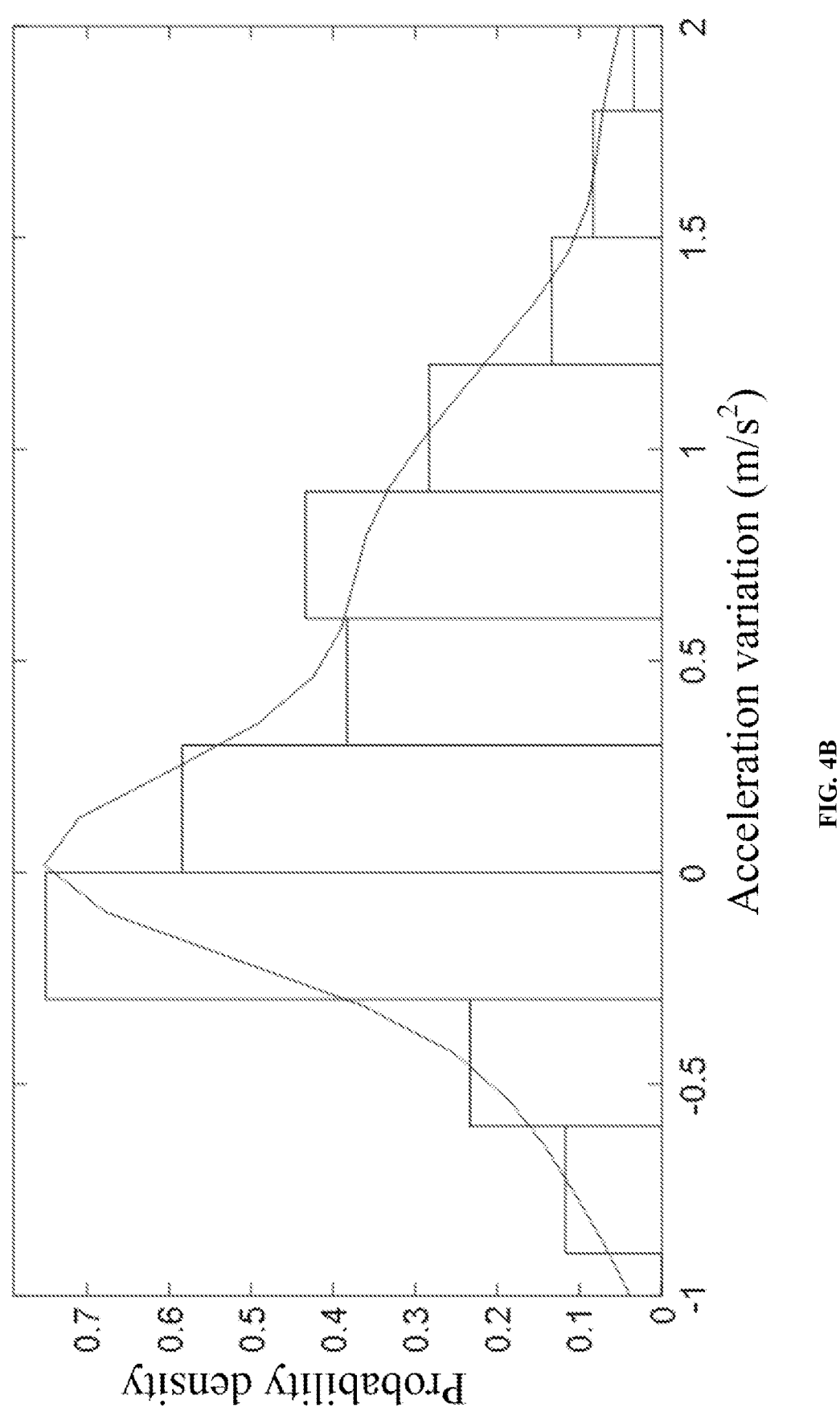
Figure 4C:
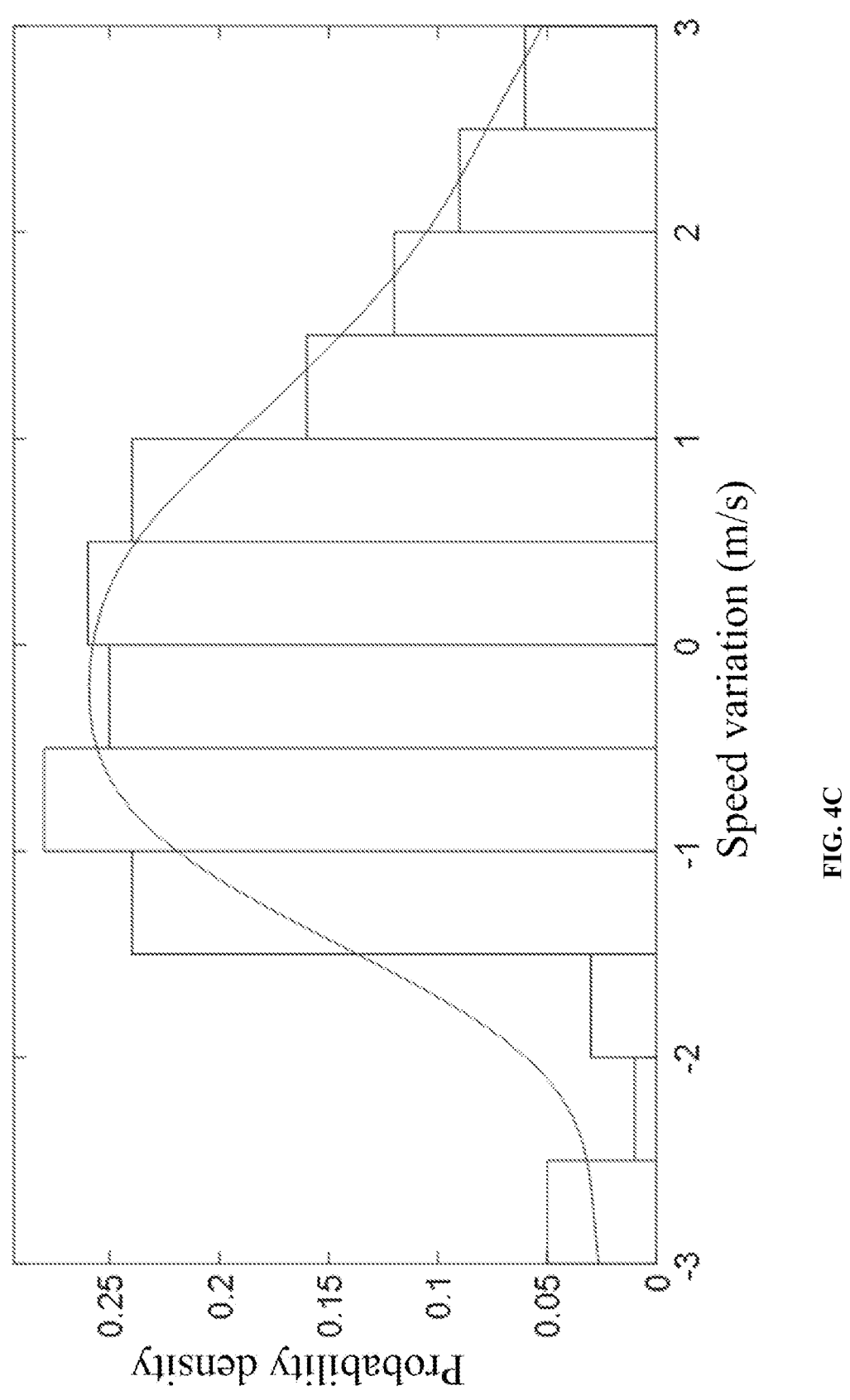
Figure 5A:
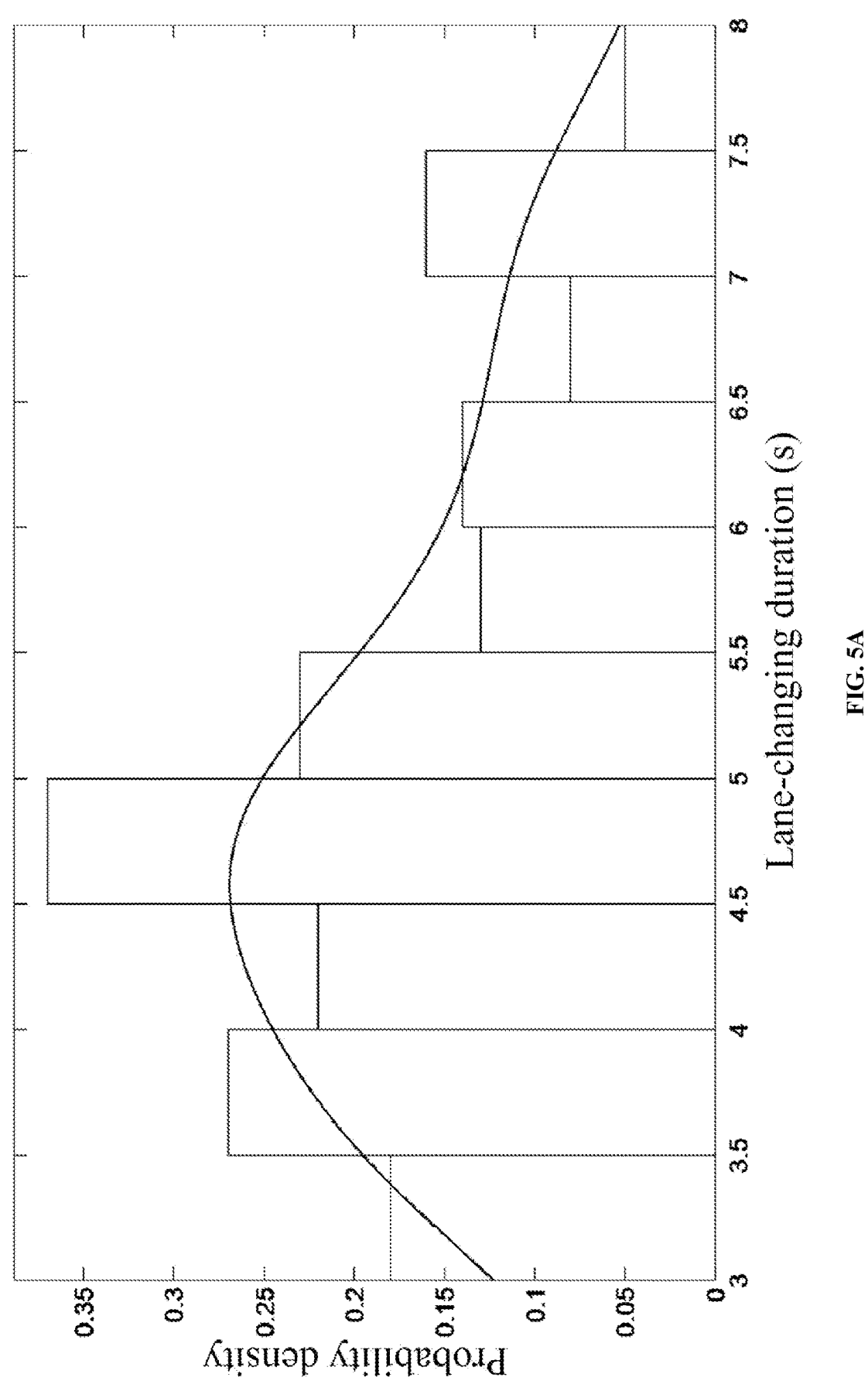
FIGS. 5A-5C show feature parameter distribution of a lane-changing trajectory in a non-obstacle-avoidance lane-changing condition according to an embodiment of the present disclosure.
Figure 5B:
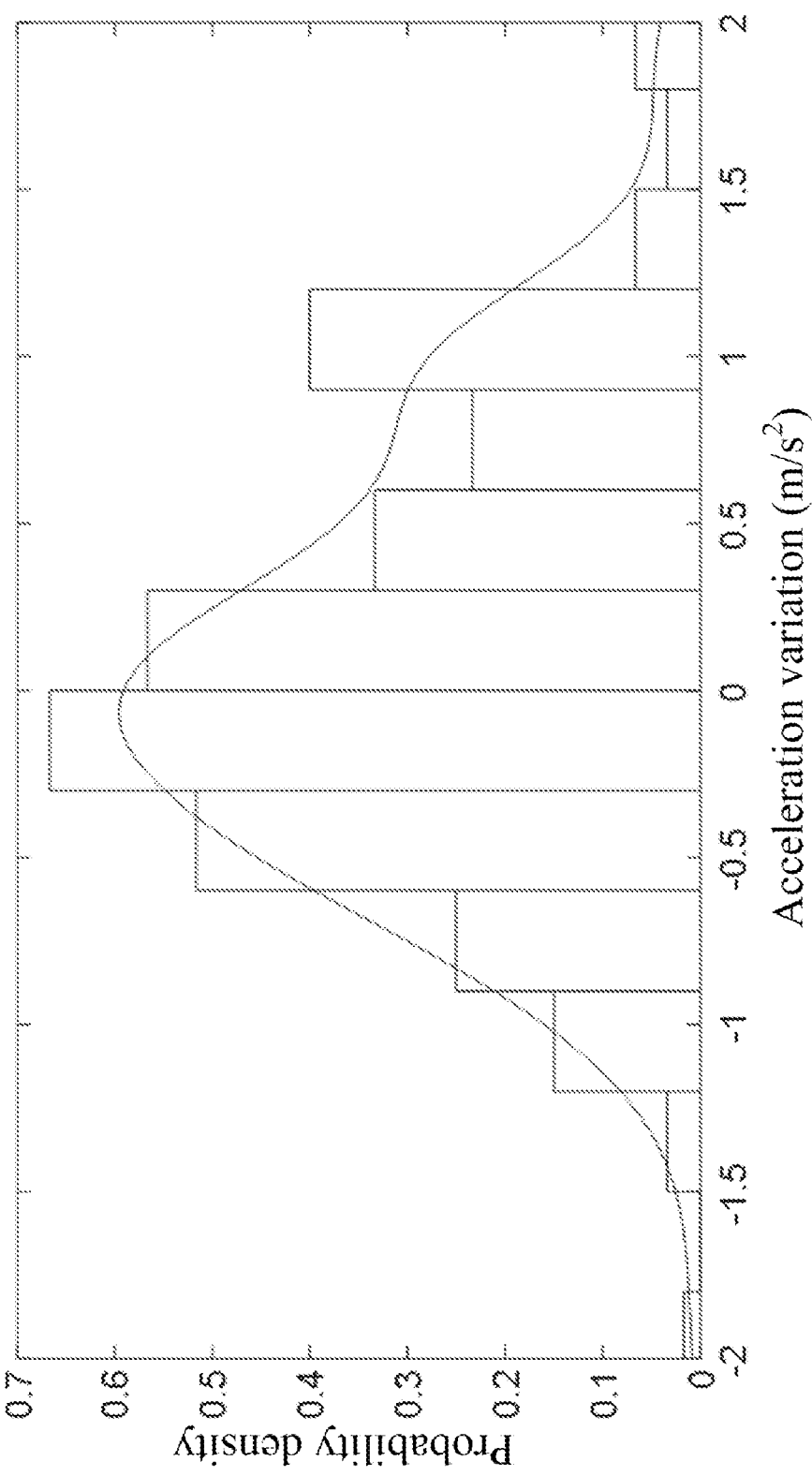
Figure 5C:
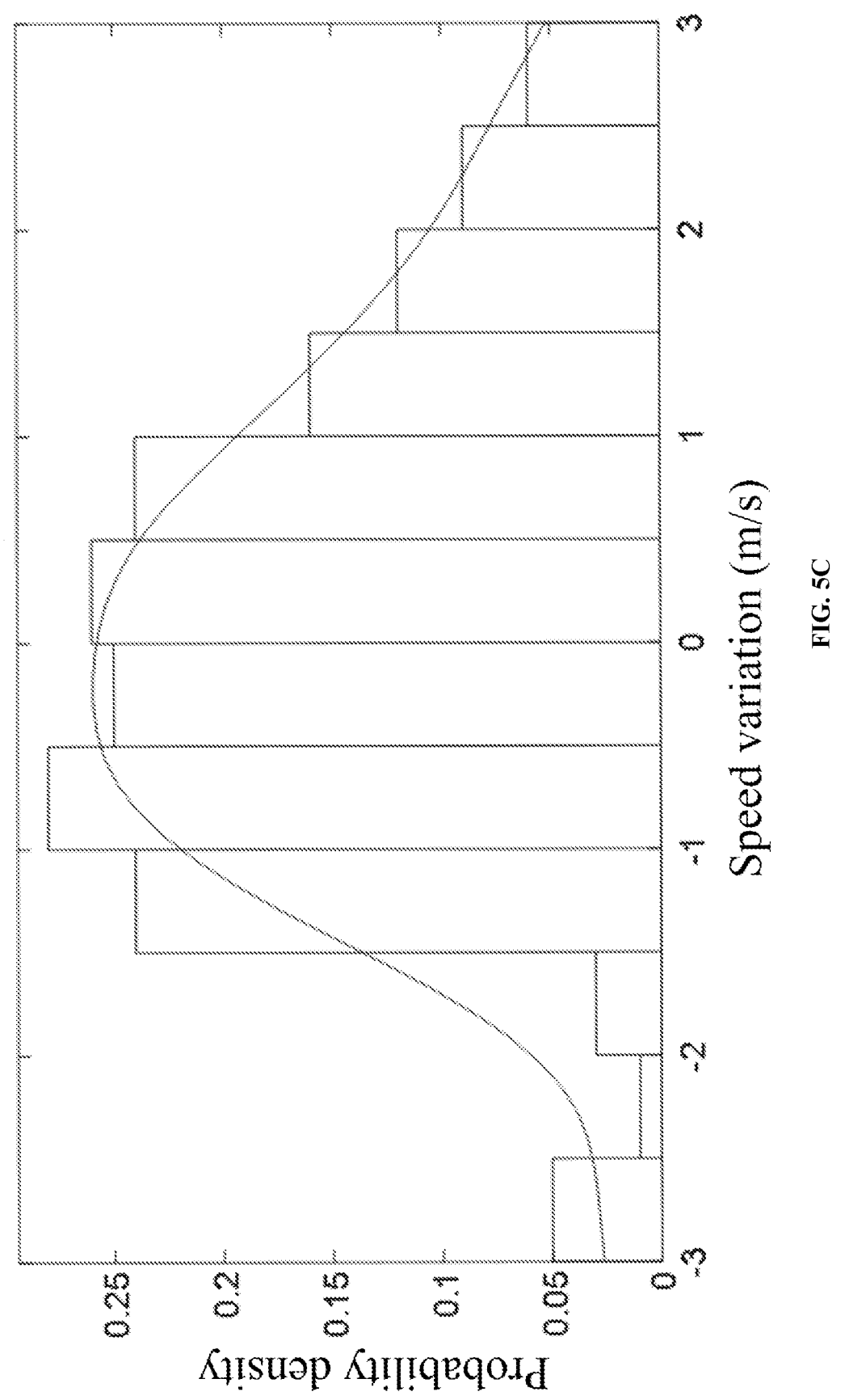

The non-obstacle-avoidance lane-changing intention parameter is calibrated based on non-obstacle-avoidance lane-changing behavioral data in an actually measured dataset, and distribution conditions shown in FIG. 3 are obtained. In addition, distribution fitting is performed by using a Gaussian kernel function. After the foregoing step is performed, the non-obstacle-avoidance lane-changing intention parameter in the non-obstacle-avoidance lane-changing intention can be modeled in a form of Gaussian kernel function distribution, which not only describes the generation process of the non-obstacle-avoidance lane-changing intention in a quantified manner, but also considers randomness in generating a lane-changing intention.

Step 102: if there is a lane-changing intention, generate an anthropomorphic lane-changing trajectory that satisfies safety constraints and reachability constraints.

Step 102 in the present disclosure aims to establish a lane-changing trajectory planning model. Specifically, on the basis that lane-changing feature parameter distribution is obtained, a quintic polynomial is used to randomly generate an anthropomorphic lane-changing trajectory. In addition, safety and reachability constraints are imposed, so as to obtain a smooth, safe, and reachable lane-changing trajectory.

A smooth, safe, and reachable lane-changing trajectory needs to be planned after a lane-changing intention is generated. The lane-changing trajectory that is based on the quintic polynomial can ensure third-order differentiability. This ensures a continuous and smooth speed, acceleration, and road curvature during lane changing. In addition, this decouples transverse motion from longitudinal motion, and makes vehicle control easier. In order to ensure that the generated lane-changing trajectory is safe and reachable, safety and reachability of the generated trajectory further need to be determined. An expression of the lane-changing trajectory that is based on the quintic polynomial is as follows:

$$\begin{cases} x(t) = a_0 + a_1 t + a_2 t^2 + a_3 t^3 + a_4 t^4 + a_5 t^5 \\ y(t) = b_0 + b_1 t + b_2 t^2 + b_3 t^3 + b_4 t^4 + b_5 t^5 \end{cases} \quad (2)$$

x(t) and y(t) represent longitudinal displacement and lateral displacement of the vehicle respectively, and $a_i$ and $b_i$ (i=1, 2, . . . , and 5) are undetermined coefficients.

A vehicle status at a moment when the lane-changing intention is generated is used as a lane-changing start point status. In this case, expressions of a longitudinal position, a longitudinal speed, and a longitudinal acceleration at a lane-changing start moment to are as follows:

$$\begin{cases} x(t_0) = a_0 + a_1 t_0 + a_2 t_0^2 + a_3 t_0^3 + a_4 t_0^4 + a_5 t_0^5 \\ \dot{x}(t_0) = a_1 + 2a_2 t_0 + 3a_3 t_0^2 + 4a_4 t_0^3 + 5a_5 t_0^4 \\ \ddot{x}(t_0) = 2a_2 + 6a_3 t_0 + 12a_4 t_0^2 + 20a_5 t_0^3 \end{cases} \quad (3)$$

Similarly, expressions of a longitudinal position, a longitudinal speed, and a longitudinal acceleration at a lane-changing end moment ti are as follows:

$$\begin{cases} x(t_1) = a_0 + a_1 t_1 + a_2 t_1^2 + a_3 t_1^3 + a_4 t_1^4 + a_5 t_1^5 \\ \dot{x}(t_1) = a_1 + 2a_2 t_1 + 3a_3 t_1^2 + 4a_4 t_1^3 + 5a_5 t_1^4 \\ \ddot{x}(t_1) = 2a_2 + 6a_3 t_1 + 12a_4 t_1^2 + 20a_5 t_1^3 \end{cases} \quad (4)$$

In order to simplify calculation and solution processes, the lane-changing start moment to is set to 0. Then, the following expressions are obtained:

$$\begin{cases} a_0 = x(t_0) \\ a_1 = \dot{x}(t_0) \\ a_2 = \ddot{x}(t_0)/2 \end{cases} \quad (5)$$

Expressions (4) and (5) are combined, to obtain the following expression:

$$\begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & T^3 & T^4 & T^5 \\ 0 & 0 & 0 & 3T^2 & 4T^3 & 5T^4 \\ 0 & 0 & 0 & 6T & 12T^2 & 20T^3 \end{pmatrix} \begin{pmatrix} a_0 \\ a_1 \\ a_2 \\ a_3 \\ a_4 \\ a_5 \end{pmatrix} = \begin{pmatrix} x(t_0) \\ \dot{x}(t_0) \\ \ddot{x}(t_0)/2 \\ x(t_1) - x(t_0) - \dot{x}(t_0)T - \ddot{x}(t_0)T^2/2 \\ \dot{x}(t_1) - \dot{x}(t_0) - \ddot{x}(t_0)T \\ \ddot{x}(t_1) - \ddot{x}(t_0) \end{pmatrix} \quad (6)$$

T represents lane-changing duration.

A total of six undetermined commissions, namely, $a_0$, $a_1$, $a_2$, $a_3$, $a_4$, and $a_5$, can be solved by solving the foregoing linear equation. Similarly, $b_0$, $b_1$, $b_2$, $b_3$, $b_4$, and $b_5$ can be solved. Details are not described herein. After the foregoing step is performed, a unique lane-changing trajectory can be determined by specifying a lane-changing start moment, a lane-changing end position, a speed, and an acceleration.

Distribution statistics on parameters such as the lane-changing duration, and a speed variation and an acceleration variation in a lane-changing process are collected based on collected lane-changing data. In addition, fitting is performed on distribution of the parameters by using a Gaussian kernel function, as shown in FIGS. 4A-4C and FIGS. 5A-5C. It is assumed that the lane-changing start moment is a moment at which the lane-changing intention is generated. Therefore, a vehicle status at the lane-changing start point is determined and known. In this case, a vehicle status at the lane-changing end point can be inferred based on the parameters such as the lane-changing duration, and the speed variation and the acceleration variation in the lane-changing process. On the basis of distribution of the foregoing feature parameters, a random sampling method can be used to initially generate a random quantity of to-be-selected lane-changing trajectories.

In a single lane-changing process, the driver cannot continuously change two lanes or occupy an opposite lane or a non-motor vehicle lane. Therefore, the following constraint needs to be imposed on maximum displacement in the lane-changing process:

$$|y_{max} - y_0| \le \frac{3}{2} W_{Lane} - \frac{1}{2} W_{Vehicle} \quad (7)$$

$y_{max}$ represents maximum lateral displacement in the lane changing process, which is measured in m; $y_0$ represents a lateral position at the lane-changing start point, which is usually a position of a lane centerline in a current lane and is measured in m; $W_{Lane}$ represents a lane width; and $W_{Vehicle}$ represents a vehicle width, which is measured in m. In the entire lane-changing process, an edge of the vehicle cannot exceed an outer lane line of a target lane.

After lane changing is completed, the driver needs to continue driving along the lane centerline as closely as possible. Therefore, the following constraint is imposed on a distance to the lane centerline after lane changing:

$$|y_1 - y_{Centerline}| \le \frac{1}{2} W_{Vehicle} \quad (8)$$

$y_1$ represents a lateral position at a lane-changing end point, which is measured in m; and $y_{Centerline}$ represents a lateral position of the lane centerline, which is measured in m. In other words, there is an intersection between an overall outline of the vehicle and a centerline of the target lane.

The foregoing two safety constraints can ensure safety of a lane-changing trajectory when there is no impact from another traffic vehicle. Due to a limitation of vehicle maneuverability, some trajectories may be unreachable. Therefore, constraints need to be imposed on reachability during trajectory planning. On the basis of actually measured data, statistics on constraint parameters such as a maximum longitudinal acceleration/deceleration, a maximum lateral acceleration/deceleration, and a maximum curvature are collected, and constraint thresholds shown in Table 2 are set.

TABLE 2

| Reachability and safety constraint thresholds | | | |
|---|---|---|---|
| Lane-changing scenario | Parameter name | Upper threshold | Lower threshold |
| Obstacle-avoidance lane changing | Longitudinal acceleration | 0.16614 g | −0.06123 g |
| | Lateral acceleration | 0.48666 g | −0.39367 g |
| | Curvature | 0.012709 1/m | 0 |
| Non-obstacle-avoidance lane changing | Longitudinal acceleration | 0.17654 g | −0.04223 g |
| | Lateral acceleration | 0.21696 g | −0.21748 g |
| | Curvature | 0.011968 1/m | 0 | g represents a gravitational acceleration, which is measured in $m/s^2$.

After the foregoing process is completed, any quantity of safe and reachable lane-changing trajectories can be obtained based on trajectory feature parameter distribution.

Step 103: Determine, based on a motion status of a traffic participant that causes a risk to the main vehicle, whether the anthropomorphic lane-changing trajectory satisfies risk constraints.

Step 103 in the present disclosure aims to establish a lane-changing risk evaluation model. Specifically, a lane-changing risk field is established to quantify a dynamic risk in a lane changing process, and dynamic risk levels of all traffic participants in the lane-changing risk field are calculated and summed up. Then, a sum-up value is used as a criterion for determining whether a lane-changing behavior satisfies the risk constraints.

Figure 6:
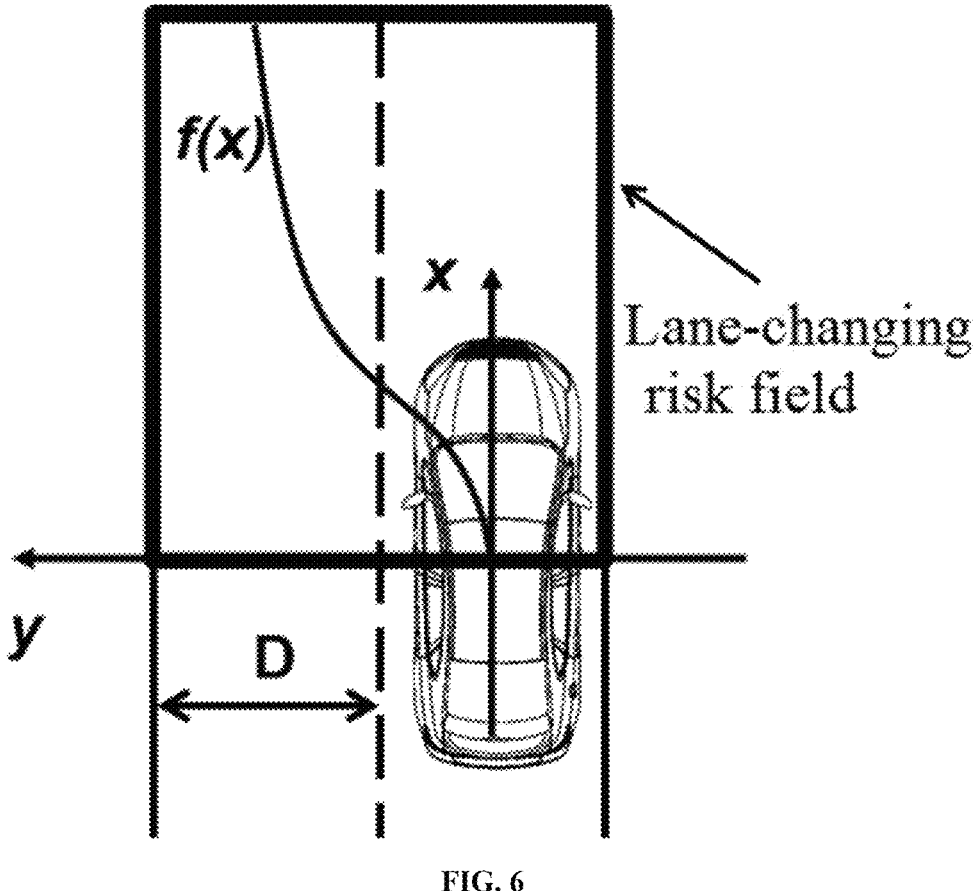
FIG. 6 is a schematic diagram of a lane-changing risk field according to an embodiment of the present disclosure.

In a lane-changing process, impacts of static obstacles and other traffic participants on a road need to be considered to ensure that a risk level in the lane-changing process is within an acceptable range. To fully evaluate the impacts of the static obstacles and other traffic participants on the lane-changing process, a risk in the lane-changing process is quantified for evaluation in the present disclosure based on a risk field theory. In combination with actual driving experience and existing studies, the following assumptions are proposed regarding a distribution rule of the lane-changing risk field:

(1) The lane-changing risk field has a boundary, a width of the lane-changing risk field equals a sum of a width of a current lane and a width of a target lane, and a length of the lane-changing risk field equals a length of a projection of the lane-changing trajectory on an x-axis of a vehicle coordinate system, as shown in FIG. 6.

(2) Risk intensity at the lane-changing start point is higher than risk intensity at the lane-changing end point.

(3) A shorter distance to the lane-changing trajectory indicates a greater impact on the lane-changing process and higher lane-changing risk intensity.

On the basis of the foregoing three assumptions, a lane-changing risk field in a static scenario is modeled based on the following expression:

$$P(x, y) = \frac{s - s(x)}{s} \cdot \frac{1}{\sqrt{2\pi}\,\sigma} \exp\left(-\frac{(y - f(x))^2}{2\sigma^2}\right) \qquad (9)$$

P represents lane-changing risk intensity; x and y represent positions in the vehicle coordinate system; s represents a length of a whole lane-changing trajectory; s(x) represents a length of the lane-changing trajectory at a point x; and σ represents a width coefficient of the lane-changing risk field.

Degrees of impacts of different traffic participants on a lane-changing risk are different. For example, a risk caused by a large truck is higher than a risk caused by a small-sized passenger car. Therefore, the degrees of impacts of different traffic participants on a lane-changing risk need to be quantified and defined as a risk value. Table 3 shows risk values of several typical traffic participants.

TABLE 3

| Risk values of different traffic participants | |
| --- | --- |
| Vehicle type | Risk value |
| Passenger car | 50 |
| Commercial vehicle | 100 |

In an actual lane-changing process, another traffic participant is usually not static but dynamically moves relative to the main vehicle. For example, a vehicle in the lateral rear drives fast. In this case, a rear-end collision may possibly occur in the lane-changing process. Alternatively, a vehicle in the lateral front drives fast. In this case, the vehicle may drive out of the risk field in a short time period and has no impact on the lane-changing process.

Figure 7:
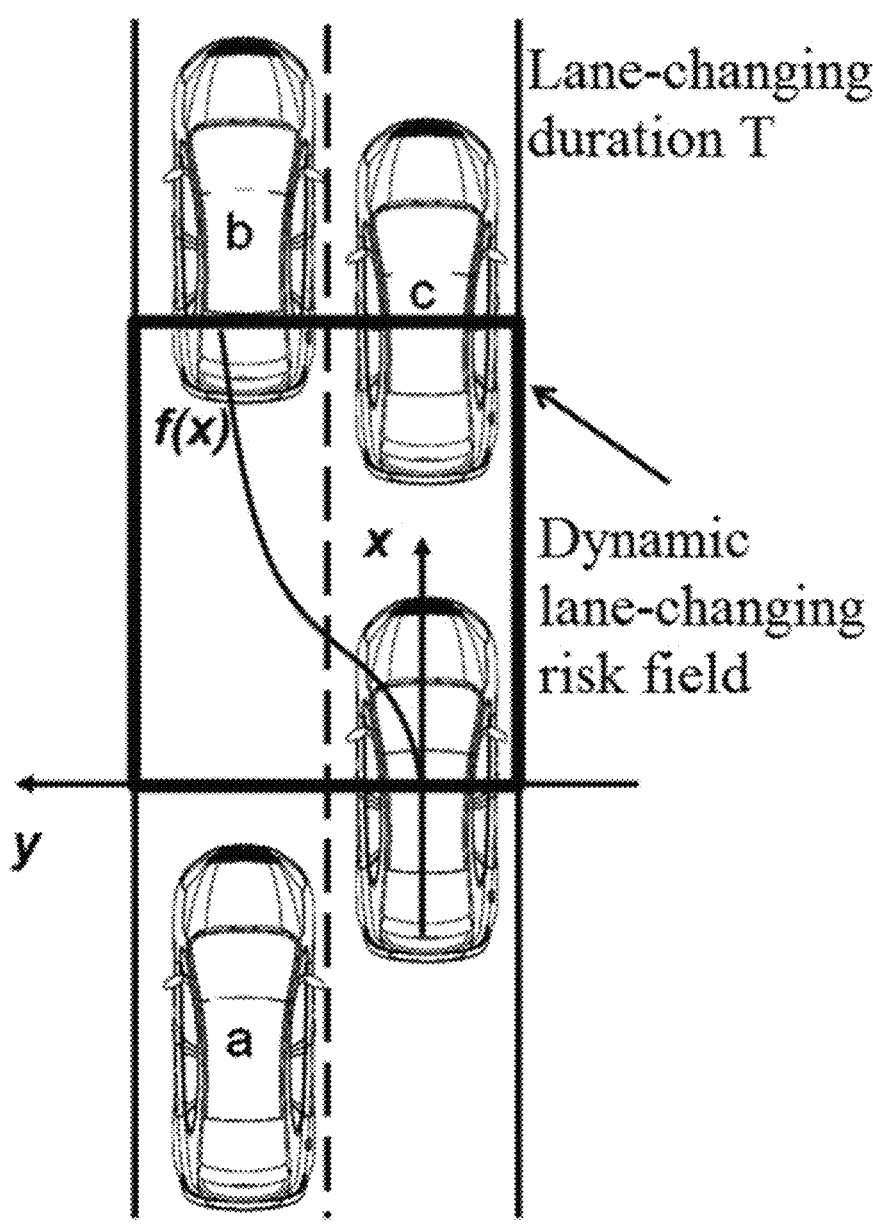
FIG. 7 is a schematic diagram of a dynamic risk field according to an embodiment of the present disclosure.

To quantify a dynamic risk level in the lane-changing process, a dynamic lane-changing risk field is designed based on the static lane-changing risk field, as shown in FIG. 7. In order to predict a motion status of a surrounding traffic participant, it is assumed that other surrounding traffic participants maintain a constant speed at a current speed in the present disclosure. Prediction duration is represented by $T_{risk}$, and motion statuses at six moments, that is, moments 0, $T_{risk}/5$, $2T_{risk}/5$, $3T_{risk}/5$, $4T_{risk}/5$, and $T_{risk}$, are selected discretely for calculation. On the basis of the expression (9), intensity of a risk caused by a specific traffic participant can be quantified by using the following expression:

$$P_{dynamic, i} = \sum_{j=0}^{5} P\left(x_i + \frac{jT_{risk}v_i}{5}, y_i\right) \qquad (10)$$

$P_{dynamic,i}$ represents intensity of a risk caused by an $i^{th}$ traffic participant; $T_{risk}$ represents a risk evaluation period; $v_i$ represents a driving speed of the $i^{th}$ traffic participant; $x_i$ and $y_i$ represent current positions of the $i^{th}$ traffic participant; and j represents a $j^{th}$ moment. In this embodiment of the present disclosure, the risk evaluation period is evenly divided by six moments: 0, $T_{risk}/5$, $2T_{risk}/5$, $3T_{risk}/5$, $4T_{risk}/5$, and $T_{risk}$.

Dynamic risk levels of all traffic participants in the lane-changing risk field are calculated and summed up, to obtain an overall risk level in the dynamic risk field. The overall risk level is shown in an expression (11) and is used as a final criterion for determining whether a lane-changing behavior satisfies the risk constraints.

$$R = \sum_{i=1}^{n} V_i P_{dynamic, i} \leq R_{threshold} \qquad (11)$$

R represents an overall risk level in a current dynamic lane-changing risk field, $V_i$ represents a risk value of the $i^{th}$ traffic participant, and $R_{threshold}$ represents a risk level threshold.

Step 104: If the risk constraints are not satisfied, regenerate an anthropomorphic lane-changing trajectory that satisfies the safety constraints and the reachability constraints, and return to Step 103.

Step 105: If the risk constraints are satisfied, perform tracking control on the anthropomorphic lane-changing trajectory based on a preview-following theory.

Step 105 in the present disclosure aims to establish a lane-changing trajectory tracking model. Specifically, after processes of generating a lane-changing intention and planning a lane-changing trajectory are modeled and lane-changing risk evaluation is performed, the planned lane-changing trajectory is tracked based on the preview-following theory.

After the foregoing step is performed, corresponding control actions are required to eliminate a deviation between the current trajectory and an expected trajectory. In the present disclosure, a process of tracking the lane-changing trajectory is modeled based on the preview-following theory. The preview-following theory is used to obtain information about a road ahead of the vehicle during driving and an expected motion status of the vehicle in advance. Then, the lane-changing trajectory obtained in Step 102 is discretized and stored in a manner shown in FIGS. 4A-C for subsequent searches.

TABLE 4

| Data table of expected trajectories | | | |
| --- | --- | --- | --- |
| No. | X-axis coordinate | Y-axis coordinate | Expected vehicle speed |
| 1 | $x_1$ | $y_1$ | $u_1$ |
| 2 | $x_2$ | $y_2$ | $u_2$ |
| . | . | . | . |
| . | . | . | . |
| . | . | . | . |
| n | $x_n$ | $y_n$ | $u_n$ |

After preview time $T_p$ elapses, lateral displacement of the vehicle is expressed as $f_e = y(t+T_p)$, and a longitudinal speed is expressed as $u_e = u(t+T)$. On the basis of the preview-following theory, it is assumed that in an ideal condition, the vehicle moves at a uniform acceleration along a straight line laterally and longitudinally. Therefore, there is an ideal lateral acceleration $a_y*$ and an ideal longitudinal acceleration $a_x*$ at each moment, enabling the vehicle to reach the expected trajectory at an expected speed after the preview time $T_p$ elapses. In this case:

$$y(t + T_p) = y + v_y T_p + \frac{1}{2} a_y^* T_p^2 \qquad (12)$$

$$y(t + T_p) = f(t + T_p) \qquad (13)$$

On the basis of expressions (12) and (13), the following expression can be derived:

$$a_y^* = \frac{2}{T_p^2} (f_e - y - v_y T_p) \qquad (14)$$

Similar to direction control, the ideal longitudinal acceleration $a_x^*$ can be calculated based on an expected vehicle speed up at a preview point, a current vehicle speed $v_x$, and the preview time $T_p$, as shown in the following expression:

$$a_x^* = (u_p - v_x)/T_p \qquad (15)$$

On the basis of a 2-degree-of-freedom model for the vehicle, a gain of a vehicle lateral acceleration relative to a steering wheel angle in a linear area can be derived, as shown in the following expression:

$$G_{ay} = \frac{v_x^2}{LI_s \left(1 + K v_x^2\right)} \qquad (16)$$

$G_{ay}$ represents the gain of the vehicle lateral acceleration relative to the steering wheel angle, $I_s$ represents an angle transmission ratio of a vehicle steering system, and K represents a vehicle stability factor.

A steering wheel angle to be applied is expressed as follows:

$$\delta_{SW} = \frac{a_y^*}{G_{ay}} \qquad (17)$$

An acceleration control process is modeled based on an proportional-integral-derivative (PID) control algorithm. A pedal opening degree a is expressed as follows:

$$\alpha = \left(K_p + K_d s + \frac{K_i}{s}\right)(a_x^* - a_x) \qquad (18)$$

$K_p$ represents a proportional coefficient, $K_i$ represents an integral coefficient, $K_d$ represents a differential coefficient, and s represents a Laplace operator.

Figure 8:
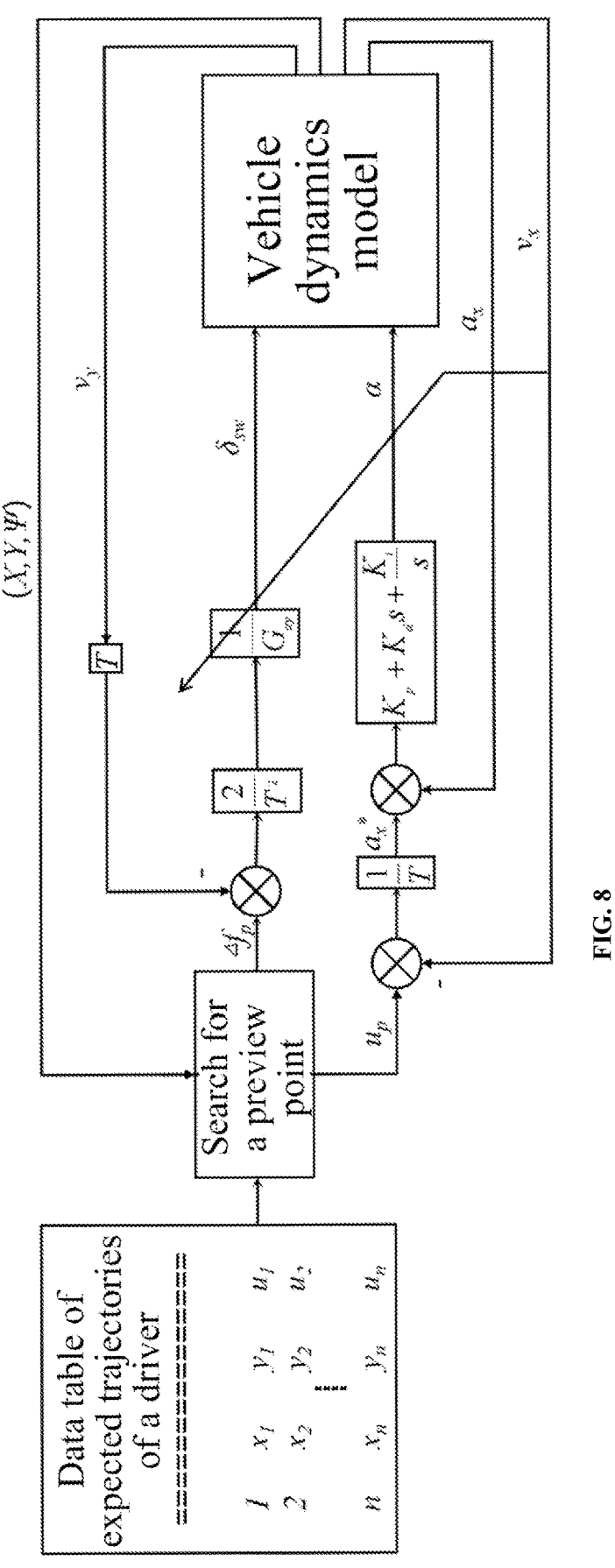
FIG. 8 is a control block diagram of a lane-changing trajectory tracking model according to an embodiment of the present disclosure.

In the foregoing derivation process, transverse control and longitudinal control of the vehicle is coupled mainly because a lateral acceleration gain of the vehicle is a function of a vehicle speed. Transverse control and longitudinal control that are performed can be decoupled by constantly updating $G_{ay}$ based on the vehicle speed. For a control block diagram of a lane-changing trajectory tracking model obtained based on the preview-following theory, refer to FIG. 8.

Embodiment 2

Embodiment 2 of the present disclosure provide an electronic device, including a memory, a processor, and a computer program that is stored in the memory and can be executed by the processor. When the processor executes the computer program, the foregoing method in Embodiment 1 is implemented.

The processor can be connected to a vehicle controller of a vehicle, obtains a motion status of the vehicle and a motion status of a front vehicle collected by a first component and a second sensor component of the vehicle, and controls a steering wheel and a pedal of the vehicle through the vehicle controller.

Embodiment 3

When the lane change control method provided in the above embodiment is applied to an autonomous vehicle, the implementation steps of the automatic lane change control method are consistent with those of the control method in Embodiment 1. In combination with a device for obtaining a motion state of a main vehicle and a front vehicle, the motion state of the main vehicle can be acquired using sensors set inside the main vehicle, such as position sensors, speed sensors, acceleration sensors, etc. The motion status of the front vehicle can be acquired using lidar, camera, etc. provided on the front side of the main vehicle. The lane change control method can be integrated into a separate controller or further integrated into a vehicle controller of the vehicle. When integrated into a separate controller, it can interact with the vehicle controller of the vehicle via a Controller Area Network (CAN) bus or a Local Interconnect Network (LIN) bus to obtain the motion status of the main vehicle and the front vehicle, and control the steering wheel and pedal of the main vehicle. In this case, the control method can be applied to autonomous vehicles by updating the vehicle controller or the autonomous vehicle program in the separate controller. This method can help determine when lane changing is necessary and the trajectory or path used to perform lane changing, thereby reducing the risk of damage or injury. Therefore, this control method improves the functionality of autonomous vehicles, providing safer and more accurate lane changing operations.

Embodiment 3 of the present disclosure provides an autonomous vehicle, where a vehicle controller of the autonomous vehicle is integrated with a computer program; or the autonomous vehicle includes a lane-changing controller, the lane-changing controller is connected to the vehicle controller via a Controller Area Network (CAN) bus or a Local Interconnect Network (LIN) bus, and the lane-changing controller is integrated with the computer program.

The vehicle controller is connected to a first sensor component and a second sensor component of the autonomous vehicle via the CAN bus or the LIN bus, the first sensor component is configured to obtain a motion status of the autonomous vehicle, and the second sensor component is configured to obtain a motion status of a front vehicle of the autonomous vehicle.

The first sensor component comprises a position sensor, a speed sensor, and an acceleration sensor.

The second sensor component comprises a lidar and a camera.

The vehicle controller is also connected to a control end of a steering wheel and a control end of a pedal of the autonomous vehicle via the CAN bus or the LIN bus.

When the vehicle controller or the lane-changing controller executes the computer program, the following steps are implemented.

Motion statuses of the main vehicle and motion statuses of a front vehicle are obtained. The motion status of the main vehicle includes a position, a speed, and an acceleration of the main vehicle, and the motion statuses of the front vehicle include a position, a speed, and an acceleration of the front vehicle; in some cases, the motion statuses of the front vehicle also include the status of steering indicator and brake indicator of the front vehicle.

Whether the main vehicle has a lane-changing intention is determined based on the motion statuses of the main vehicle and a front vehicle in a current lane. The lane-changing intention includes an obstacle-avoidance lane-changing intention and a non-obstacle-avoidance lane-changing intention. The obstacle-avoidance lane-changing intention is determined based on the motion statuses of the main vehicle and the motion statuses of the front vehicle. The non-obstacle-avoidance lane-changing intention is represented by a non-obstacle-avoidance lane-changing intention parameter of the main vehicle. For details, reference can be made to the foregoing embodiments.

If there is a lane-changing intention, an anthropomorphic lane-changing trajectory that satisfies safety constraints and reachability constraints is generated.

Whether the anthropomorphic lane-changing trajectory satisfies risk constraints is determined based on a motion status of a traffic participant that causes a risk to the main vehicle.

If the risk constraints are not satisfied, an anthropomorphic lane-changing trajectory that satisfies the safety constraints and the reachability constraints is regenerated, and return to the step of "determining, based on a motion status of a traffic participant that causes a risk to the main vehicle, whether the anthropomorphic lane-changing trajectory satisfies risk constraints". The dynamic risk levels of all traffic participants in the lane changing risk field are calculated and summed up, and the overall risk level in the dynamic risk field can be obtained. The constraint on this overall risk level is called a risk constraint, which can be set to help reduce the occurrence of risk accidents.

If the risk constraints are satisfied, performing tracking control on the anthropomorphic lane-changing trajectory based on a preview-following theory, to trace the anthropomorphic lane-changing trajectory and achieve automatic lane change.

In Embodiment 4 of the present disclosure, according to the control method described above, by using the sensors set on the main vehicle that can obtain the operating status of the main vehicle and the sensors that can obtain the operating status of the front vehicle, the motion status of the main vehicle and the front vehicle are collected. This can help determine whether there is a lane changing intention. When there is a lane changing intention, a cyclic update method is adopted based on the lane changing intention to obtain an anthropomorphic lane changing trajectory that meet safety, accessibility and risk control requirements. The steering wheel and pedal of the main vehicle are controlled to track the anthropomorphic lane changing trajectory, achieving automatic lane changing control of the main vehicle.

To sum up, the embodiments of the present disclosure have the following beneficial effects:

The present disclosure constructs a driver lane-changing model having independent decision-making and interaction capabilities; and implements, based on actually measured data, lane-changing intention generation, lane-changing trajectory planning, lane-changing risk evaluation, and lane-changing trajectory tracking.

In the present disclosure, lane-changing intentions are specifically classified into two categories: obstacle-avoidance lane changing and non-obstacle-avoidance lane changing. This more comprehensively considers influencing factors that trigger lane-changing intentions. In addition, the present disclosure quantifies a difference between two types of lane-changing trajectories in a lane-changing trajectory planning process based on actually measured data, and considers randomness inherent in a human driver.

The present disclosure fully considers a dynamic impact of another traffic participant on a lane-changing risk in a lane-changing process. In this way, a lane-changing risk level change in a future time period can be quantified, and a risk level quantification result is used to determine whether to perform a lane-changing operation. This ensures safety of a lane-changing behavior.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple. For related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. An lane-changing control method for vehicles, wherein the method comprises the following steps:

determining that a main vehicle has a lane-changing intention based on motion statuses of the main vehicle and motion statuses of a front vehicle in a current lane;

wherein the motion statuses of the main vehicle comprise a position, a speed, and an acceleration of the main vehicle, and the motion statuses of the front vehicle comprise a position, a speed, and an acceleration of the front vehicle;

in response to there being the lane-changing intention, generating an a lane-changing trajectory that satisfies safety constraints and reachability constraints;

determining, based on a motion status of a traffic participant that causes a risk to the main vehicle, whether the lane-changing trajectory satisfies risk constraints; and in response to the risk constraints being not satisfied, regenerating the lane-changing trajectory that satisfies the safety constraints and the reachability constraints, and returning to the step of "determining, based on a motion status of a traffic participant that causes a risk to the main vehicle, whether the lane-changing trajectory satisfies risk constraints"; or in response to the risk constraints being satisfied, controlling a steering wheel and a pedal of the main vehicle to track the lane-changing trajectory based on a preview-following theory and perform lane changing of the main vehicle;

wherein the lane-changing intention comprises an obstacle-avoidance lane-changing wherein the lane-changing intention is an obstacle-avoidance lane-changing wherein determining whether that a main vehicle has a lane-changing intention based on the motion statuses of the main vehicle and the motion statuses of the front vehicle in the current lane comprises:

inputting operating statuses of the main vehicle and operating statuses of the front vehicle in the current lane into a trained back propagation (BP) neural network to determine whether the obstacle-avoidance lane-changing intention is generated; and based on whether a non-obstacle-avoidance lane-changing intention parameter of the main vehicle exceeds a non-obstacle-avoidance lane-changing intention parameter threshold, determining whether the non-obstacle-avoidance lane-changing intention is generated;

wherein the non-obstacle-avoidance lane-changing intention parameter is calculated based on the following formula:

$$D(k) = \begin{cases} D(k-1) + \dfrac{v_0 - v(k)}{v(k)} \cdot T, \; v(k) \le v_0 \\ 0, \; v(k) > v_0 \end{cases},$$

wherein $D(k)$ and $D(k-1)$ represent non-obstacle-avoidance lane-changing intention parameters calculated based on a $k^{th}$ sampling and a $(k-1)^{th}$ sampling respectively, $v_0$ represents an expected cruising speed, and $v(k)$ represents a vehicle speed at which the main vehicle follows the front vehicle and that is obtained in the $k^{th}$ sampling, and T represents a sampling interval.

2. The lane-changing control method for vehicles according to claim 1, wherein the generating the lane-changing trajectory that satisfies the safety constraints and the reachability constraints comprises constructing a quintic polynomial that represents the lane-changing trajectory;

using, as a lane-changing start point status, a motion status of the main vehicle at a moment when the lane-changing intention is generated;

randomly generating a plurality of types of lane-changing feature parameters based on lane-changing feature parameter distribution;

determining, based on each of the plurality of types of lane-changing feature parameters, a lane-changing end point status corresponding to each type of lane-changing feature parameter;

based on the lane-changing start point status and the lane-changing end point status corresponding to each type of lane-changing feature parameter, solving a parameter in the quintic polynomial and obtaining lane-changing trajectories corresponding to the plurality of types of lane-changing feature parameters; and selecting, from the lane-changing trajectories corresponding to the plurality of types of lane-changing feature parameters, the lane-changing trajectory that satisfies the safety constraints and the reachability constraints.

3. The lane-changing control method for vehicles according to claim 2, wherein the safety constraints comprise:

$$|y_{max} - y_0| \le \frac{3}{2} W_{Lane} - \frac{1}{2} W_{Vehicle},$$

and $$|y_1 - y_{Centerline}| \le \frac{1}{2} W_{Vehicle},$$

wherein $y_{max}$ represents maximum lateral displacement during the lane changing, $y_0$ represents a lateral position at a lane-changing start point, $W_{Lane}$ represents a lane width, $W_{vehicle}$ represents a vehicle width, $y_1$ represents a lateral position at a lane-changing end point, and $y_{Centerline}$ represents a lateral position of a lane centerline after the lane changing.

4. The lane-changing control method for vehicles according to claim 2, wherein the reachability constraints comprise:

during the lane changing, a longitudinal acceleration of the main vehicle is within a reachable longitudinal acceleration range, a lateral acceleration of the main vehicle is within a reachable lateral acceleration range, and a curvature of the main vehicle is within a reachable curvature range.

5. The lane-changing control method according to claim 1, wherein the risk constraints comprise:

$$R = \sum_{i=1}^{n} V_i P_{dynamic,i} \le R_{threshold},$$

$$P_{dynamic,i} = \sum_{j=0}^{5} P\left(x_i + \frac{jT_{risk}v_i}{5}, y_i\right),$$

and $$P\left(x_i + \frac{jT_{risk}v_i}{5}, y_i\right) =$$

$$\frac{s - s\left(x_i + \frac{jT_{risk}v_i}{5}\right)}{s} \cdot \frac{1}{\sqrt{2\pi}\,\sigma} \exp\left(-\frac{\left(y_i - f\left(x_i + \frac{jT_{risk}v_i}{5}\right)\right)^2}{2\sigma^2}\right),$$

wherein

R represents an overall risk level in a current dynamic lane-changing risk field, $V_i$ represents a risk value of an $i^{th}$ traffic participant, $R_{threshold}$ represents a risk level threshold, $P_{dynamic,i}$ represents intensity of a risk caused by the $i^{th}$ traffic participant, $T_{risk}$ represents a risk evaluation period, $v_i$ represents a driving speed of the $i^{th}$ traffic participant, $x_i$ and $y_i$ respectively represent an x-axis coordinate and a y-axis coordinate of the $i^{th}$ traffic participant in a current position, j represents a $j^{th}$ moment, s represents a length of the overall lane-changing trajectory, $$s\left(x_i + \frac{jT_{risk}v_i}{5}\right)$$

represents a length of the lane-changing trajectory at a point $$x_i + \frac{jT_{risk}v_i}{5},$$

and $\sigma$ represents a width coefficient of a lane-changing risk field.

6. The lane-changing control method for vehicles according to claim 1, wherein the controlling the steering wheel and the pedal of the main vehicle to track the lane-changing trajectory based on the preview- following theory and perform the lane changing of the main vehicle comprises:

determining, based on the lane-changing trajectory, an ideal longitudinal acceleration and an ideal lateral acceleration of the main vehicle after preview time $T_p$ elapses;

calculating a steering wheel angle based on the ideal lateral acceleration, as shown in the following expression:

$$\delta_{SW} = \frac{a_y^*}{G_{ay}},$$

wherein $\delta_{SW}$ represents the steering wheel angle, $G_{ay}$ represents a gain of a vehicle lateral acceleration relative to the steering wheel angle, and $a_y^*$ represents the ideal lateral acceleration; and calculating a pedal opening degree based on the ideal longitudinal acceleration, as shown in the following expression:

$$\alpha = \left(K_p + K_d s + \frac{K_i}{s}\right)(a_x^* - a_x),$$

wherein $\alpha$ represents the pedal opening degree, $K_p$ represents a proportional coefficient, $K_i$ represents an integral coefficient, $K_d$ represents a differential coefficient, s represents a Laplace operator, $a_x^*$ represents the ideal longitudinal acceleration, and $a_x$ represents a current longitudinal acceleration of the main vehicle.

7. An autonomous vehicle, wherein a vehicle controller of the autonomous vehicle is integrated with a computer program; or the autonomous vehicle comprises a lane-changing controller, the lane-changing controller is connected to the vehicle controller via a Controller Area Network (CAN) bus or a Local Interconnect Network (LIN) bus, and the lane-changing controller is integrated with the computer program;

the vehicle controller is connected to a first sensor component and a second sensor component of the autonomous vehicle via the CAN bus or the LIN bus, the first sensor component is configured to obtain a motion status of the autonomous vehicle, and the second sensor component is configured to obtain a motion status of a front vehicle of the autonomous vehicle;

the first sensor component comprises a position sensor, a speed sensor, and an acceleration sensor;

the second sensor component comprises a lidar and a camera;

the vehicle controller is also connected to a control end of a steering wheel and a control end of a pedal of the autonomous vehicle via the CAN bus or the LIN bus; and when the vehicle controller or the lane-changing controller executes the computer program, the following steps are implemented:

determining whether a main vehicle has a lane-changing intention based on motion statuses of the main vehicle and motion statuses of the front vehicle in a current lane; wherein the motion statuses of the main vehicle comprise a position, a speed, and an acceleration of the main vehicle, and the motion statuses of the front vehicle comprise a position, a speed, and an acceleration of the front vehicle;

in response to there being the lane-changing intention, generating an lane-changing trajectory that satisfies safety constraints and reachability constraints;

determining, based on a motion status of a traffic participant that causes a risk to the main vehicle, whether the lane-changing trajectory satisfies risk constraints; and the risk constraints being not satisfied, regenerating the lane-changing trajectory that satisfies the safety constraints and the reachability constraints, and returning to the step of "determining, based on a motion status of a traffic participant that causes a risk to the main vehicle, whether the lane-changing trajectory satisfies risk constraints"; or in response to the risk constraints being satisfied, controlling the steering wheel and the pedal of the main vehicle to track the lane-changing trajectory, based on a preview-following theory and perform lane changing of the main vehicle;

wherein the lane-changing intention comprises an obstacle-avoidance lane-changing intention and/or a non-obstacle-avoidance lane-changing intention; and wherein the determining whether the main vehicle has the lane-changing intention based on the motion statuses of the main vehicle and the motion statuses of the front vehicle in the current lane comprises:

inputting operating statuses of the main vehicle and operating statuses of the front vehicle in the current lane into a trained back propagation (BP) neural network to determine whether the obstacle-avoidance lane-changing intention is generated; and based on whether a non-obstacle-avoidance lane-changing intention parameter of the main vehicle exceeds a non-obstacle-avoidance lane-changing intention parameter threshold, determining whether the non-obstacle-avoidance lane-changing intention is generated;

wherein the non-obstacle-avoidance lane-changing intention parameter is calculated based on the following formula:

$$D(k) = \begin{cases} D(k-1) + \dfrac{v_0 - v(k)}{v(k)} \cdot T, \ v(k) \leq v_0 \\ 0, \ v(k) > v_0 \end{cases},$$

wherein $D(k)$ and $D(k-1)$ represent non-obstacle-avoidance lane-changing intention parameters calculated based on a kth sampling and a (k−1) th sampling respectively, v0 represents an expected cruising speed, and v(k) represents a vehicle speed at which the main vehicle follows the front vehicle and that is obtained in the $k^{th}$ sampling, and T represents a sampling interval.

* * * * *